United States Patent
Miyamoto et al.

(10) Patent No.: US 9,740,292 B2
(45) Date of Patent: Aug. 22, 2017

(54) COMPUTER-READABLE STORAGE MEDIUM HAVING STORED THEREIN DISPLAY CONTROL PROGRAM, DISPLAY CONTROL SYSTEM, DISPLAY CONTROL APPARATUS, AND DISPLAY CONTROL METHOD

(75) Inventors: Shigeru Miyamoto, Kyoto (JP); Koichi Hayashida, Kyoto (JP); Kiyoshi Takeuchi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 85 days.

(21) Appl. No.: 13/534,496

(22) Filed: Jun. 27, 2012

(65) Prior Publication Data
US 2013/0076618 A1    Mar. 28, 2013

(30) Foreign Application Priority Data
Sep. 22, 2011 (JP) .................. 2011-208214

(51) Int. Cl.
G02B 27/22 (2006.01)
G06F 3/01 (2006.01)
G06F 3/03 (2006.01)
H04N 13/00 (2006.01)
H04N 13/04 (2006.01)

(52) U.S. Cl.
CPC ............ G06F 3/017 (2013.01); G02B 27/22 (2013.01); G06F 3/0304 (2013.01); H04N 13/0011 (2013.01); H04N 13/0022 (2013.01); H04N 13/0402 (2013.01)

(58) Field of Classification Search
CPC .............. G06F 3/0418; H04N 13/0018; H04N 5/23212; G02B 27/22
See application file for complete search history.

(56) References Cited

U.S. PATENT DOCUMENTS

| | | | | |
|---|---|---|---|---|
| 8,482,557 | B2* | 7/2013 | Masuda | 345/419 |
| 2005/0253924 | A1* | 11/2005 | Mashitani | 348/42 |
| 2010/0231691 | A1* | 9/2010 | Lee | H04N 5/23212 348/47 |
| 2011/0103680 | A1* | 5/2011 | Mashitani et al. | 382/154 |
| 2012/0056885 | A1* | 3/2012 | Ishii | H04N 13/0018 345/419 |
| 2012/0120060 | A1* | 5/2012 | Noda | 345/419 |
| 2012/0120061 | A1* | 5/2012 | Noda | 345/419 |

FOREIGN PATENT DOCUMENTS

JP    2003-107603    4/2003

* cited by examiner

*Primary Examiner* — Nicholas Lee
*Assistant Examiner* — Richard Hong
(74) *Attorney, Agent, or Firm* — Nixon & Vanderhye P.C.

(57) ABSTRACT

An exemplary information processing apparatus selectively switches between: first control where control is performed such that, in a virtual space, a position of producing no parallax on a screen of a stereoscopic display is a first position near a predetermined object; and second control where control is performed such that the position of producing no parallax is closer to a viewpoint position of virtual cameras than the first position is.

11 Claims, 5 Drawing Sheets

First Mode

Second Mode

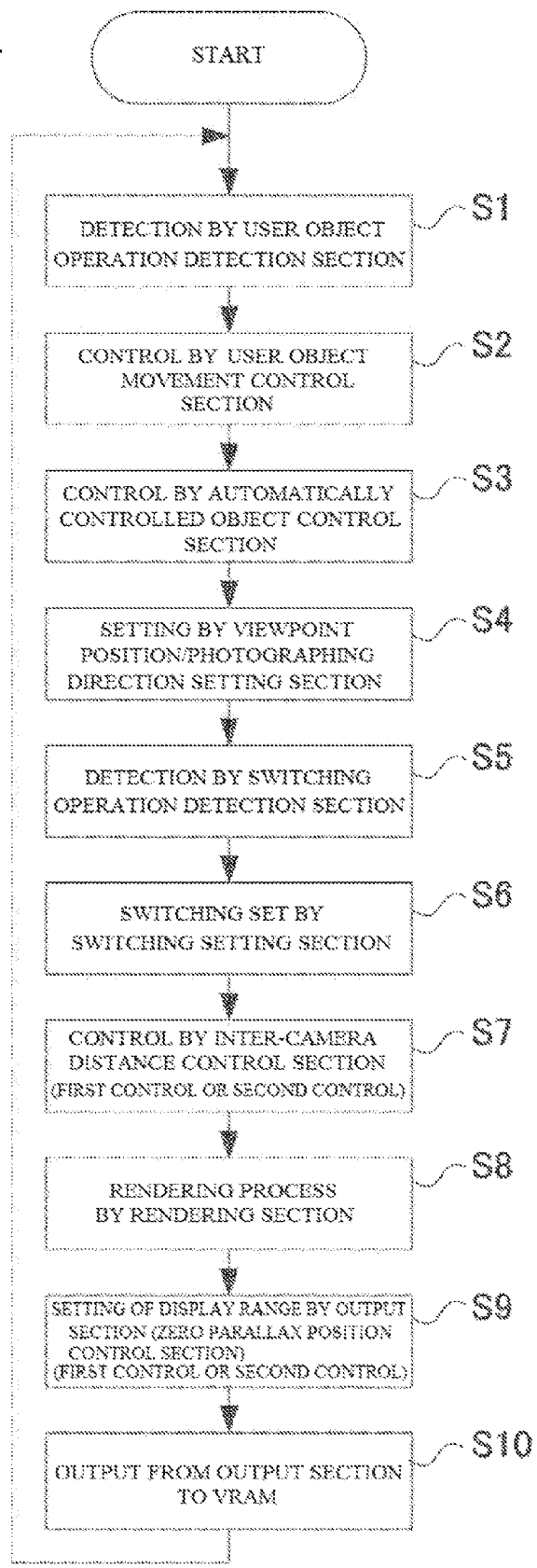

COMPUTER-READABLE STORAGE MEDIUM HAVING STORED THEREIN DISPLAY CONTROL PROGRAM, DISPLAY CONTROL SYSTEM, DISPLAY CONTROL APPARATUS, AND DISPLAY CONTROL METHOD

CROSS REFERENCE TO RELATED APPLICATION

The disclosure of Japanese Patent Application No. 2011-208214, filed on Sep. 22, 2011, is incorporated herein by reference.

FIELD

The technique disclosed herein relates to a technique of performing stereoscopic display.

BACKGROUND AND SUMMARY

Conventionally, a method of performing stereoscopic display is known.

A technique is required for performing stereoscopic display with a higher visibility.

It is an object of an exemplary embodiment to provide a computer-readable storage medium having stored therein a display control program capable of performing stereoscopic display with a higher visibility, a display control system, a display control apparatus, and a display control method that are capable of performing stereoscopic display with a higher visibility.

A computer-readable storage medium having stored therein a program according to an exemplary embodiment has stored therein a program to be executed by an information processing apparatus connected to a display apparatus capable of displaying a stereoscopic image, the program causing a processing section of the information processing apparatus to execute: generating a stereoscopic image by photographing, with a plurality of virtual cameras set at a predetermined viewpoint position in a virtual space where a predetermined object is present, the virtual space so as to include the object; and outputting the generated stereoscopic image to the display apparatus, and selective switching is performed between: first control where control is performed such that, in the virtual space, a position of producing no parallax on a screen of the display apparatus is a first position near the object; and second control where control is performed such that the position of producing no parallax is closer to the viewpoint position than the first position is.

In addition, this configuration can be achieved as a system, an apparatus, or a method.

The above configuration makes it possible to switch the depth at which the predetermined object appears relative to the screen.

If the stereoscopic image depicting the virtual space is displayed on the display apparatus, objects in the virtual space are different from each other in a sense of depth relative to the screen of the display apparatus, depending on the depth distances (the distances in the photographing direction) between the viewpoint position of the virtual cameras and the objects. That is, when viewed in the photographing direction from the viewpoint position of the virtual cameras, an object present closer to the viewpoint position than a predetermined position is appears as if coming out of the screen of the display apparatus. An object present further away from the viewpoint position than the predetermined position is appears as if present further in the depth direction than the screen. An object present at the predetermined position appears as if present on the screen. The "position of producing no parallax on the display apparatus" corresponds to the "predetermined position", and is a position where an object present at it appears as if present on the screen of the display apparatus. In the descriptions given later, this position will be referred to as a "zero parallax position".

On the basis of the computer-readable storage medium having stored therein the program according to the exemplary embodiment, when the first control has been selected, a distance between the plurality of virtual cameras may be set smaller than when the second control has been selected.

In the first control described above, the zero parallax position is located near the "predetermined object", which makes it likely that another object present between the "predetermined object" and the virtual cameras appears as if coming out of the screen. Further, the amount of the coming out is relatively great.

On the other hand, in the second control described above, the zero parallax position is located closer to the virtual cameras than in the first control, which makes it less likely that said another object appears as if coming out of the screen. Further, the amount of the coming out is relatively small.

Here, the distance between the virtual cameras is made relatively small in the first control, and the distance between the virtual cameras is made relatively great in the second control. This makes it possible to, when controlling the "predetermined object" to appear on the screen or near the screen in the depth direction in the first control, increase the visibility of another object. This also makes it possible to, when controlling the "predetermined object" to appear in the second control as if present further in the depth direction than the screen, increase the stereoscopic effects of the "predetermined object" and another object to enhance the dynamism.

On the basis of the computer-readable storage medium having stored therein the program according to the exemplary embodiment, the program may further cause the processing section to execute controlling an action of the object in accordance with a first operation performed by a user, the action including at least a movement.

On the basis of the computer-readable storage medium having stored therein the program according to the exemplary embodiment, the program may further cause the processing section to execute switching between the first control and the second control in accordance with a second operation performed by a user.

On the basis of the computer-readable storage medium having stored therein the program according to the exemplary embodiment, the second operation may be received simultaneously with the first operation.

An information processing system according to another exemplary embodiment is an information processing system connected to a display apparatus capable of displaying a stereoscopic image, the information processing system including a display control section for generating a stereoscopic image by photographing a virtual space with a plurality of virtual cameras set at a predetermined viewpoint position in the virtual space where an object is present; and for outputting the generated stereoscopic image to the display apparatus. The display control section changes, in the virtual space, a position of producing no parallax on a screen of the display apparatus, such that the position is located further away from the viewpoint position, and the display control section also narrows a distance between the plurality of virtual cameras.

In addition, this configuration can be achieved as a program, an apparatus, or a method.

An information processing system according to another exemplary embodiment is an information processing system connected to a display apparatus capable of displaying a stereoscopic image, the information processing system including a display control section for generating a stereoscopic image by photographing a virtual space with a plurality of virtual cameras set at a predetermined viewpoint position in the virtual space where an object is present; and for outputting the generated stereoscopic image to the display apparatus. The display control section changes, in the virtual space, a position of producing no parallax on a screen of the display apparatus, such that the position is located closer to the viewpoint position, and the display control section also widens a distance between the plurality of virtual cameras.

In addition, this configuration can be achieved as a program, an apparatus, or a method.

In addition, an information processing system according to another exemplary embodiment is an information processing system connected to a display apparatus capable of displaying a stereoscopic image, the information processing system including a display control section for generating a stereoscopic image by photographing, with a plurality of virtual cameras set at a predetermined viewpoint position in a virtual space where an object is present, the virtual space so as to include the object; and for outputting the generated stereoscopic image to the display apparatus. The display control section changes, in the virtual space, a position of producing no parallax on a screen of the display apparatus, such that the position is located further away from the object, and the display control section also widens a distance between the plurality of virtual cameras.

In addition, this configuration can be achieved as a program, an apparatus, or a method.

In addition, an information processing system according to another exemplary embodiment is an information processing system connected to a display apparatus capable of displaying a stereoscopic image, the information processing system including a display control section for generating a stereoscopic image by photographing, with a plurality of virtual cameras set at a predetermined viewpoint position in a virtual space where an object is present, the virtual space so as to include the object; and for outputting the generated stereoscopic image to the display apparatus. The display control section changes, in the virtual space, a position of producing no parallax on a screen of the display apparatus, such that the position is located closer to the object, and the display control section also narrows a distance between the plurality of virtual cameras.

In addition, this configuration can be achieved as a program, an apparatus, or a method.

The exemplary embodiment makes it possible to perform stereoscopic display with a higher visibility.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 is an example non-limiting flow chart.

DETAILED DESCRIPTION OF NON-LIMITING EXAMPLE EMBODIMENTS

Figure 1:
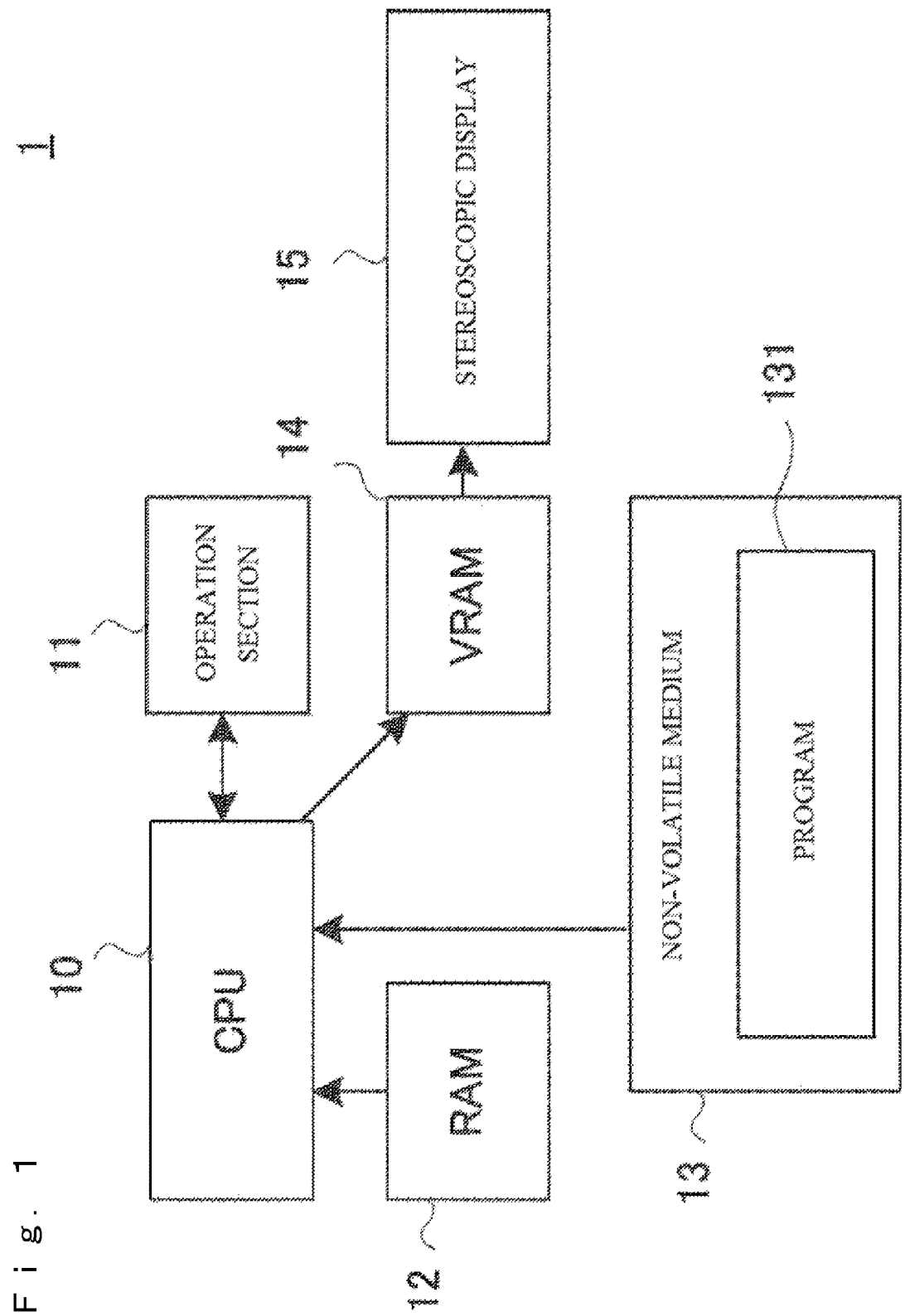
FIG. 1 is an example non-limiting hardware block diagram of an information processing apparatus.

FIG. 1 is a hardware block diagram of an information processing apparatus 1. The information processing apparatus 1 includes a CPU 10, an operation section 11, a RAM 12, a non-volatile medium 13, a VRAM 14, and a stereoscopic display 15. The operation section 11 can employ a given device such as a button switch, a direction switch, a touch panel, or a joystick/slide pad. The non-volatile medium 13 is a medium built into, or attachable to and detachable from, the information processing apparatus, and has a program 131 stored therein in a non-volatile manner. The program 131 includes a program for causing the CPU 10 to perform the functions described later with reference to FIG. 2, and data of the models, the textures, and the like of a virtual space and objects (a user object and an automatically controlled object) present in the virtual space. The program 131 is read by the CPU 10, is loaded into the RAM 12, and is executed by the CPU 10. Image data generated by the execution of the program 131 by the CPU 10 is written to the VRAM 14, and is then output to the stereoscopic display 15. Typically, the stereoscopic display is a parallax barrier, or lenticular, autostereoscopic display, but may also be a glasses-type stereoscopic display.

Figure 2:
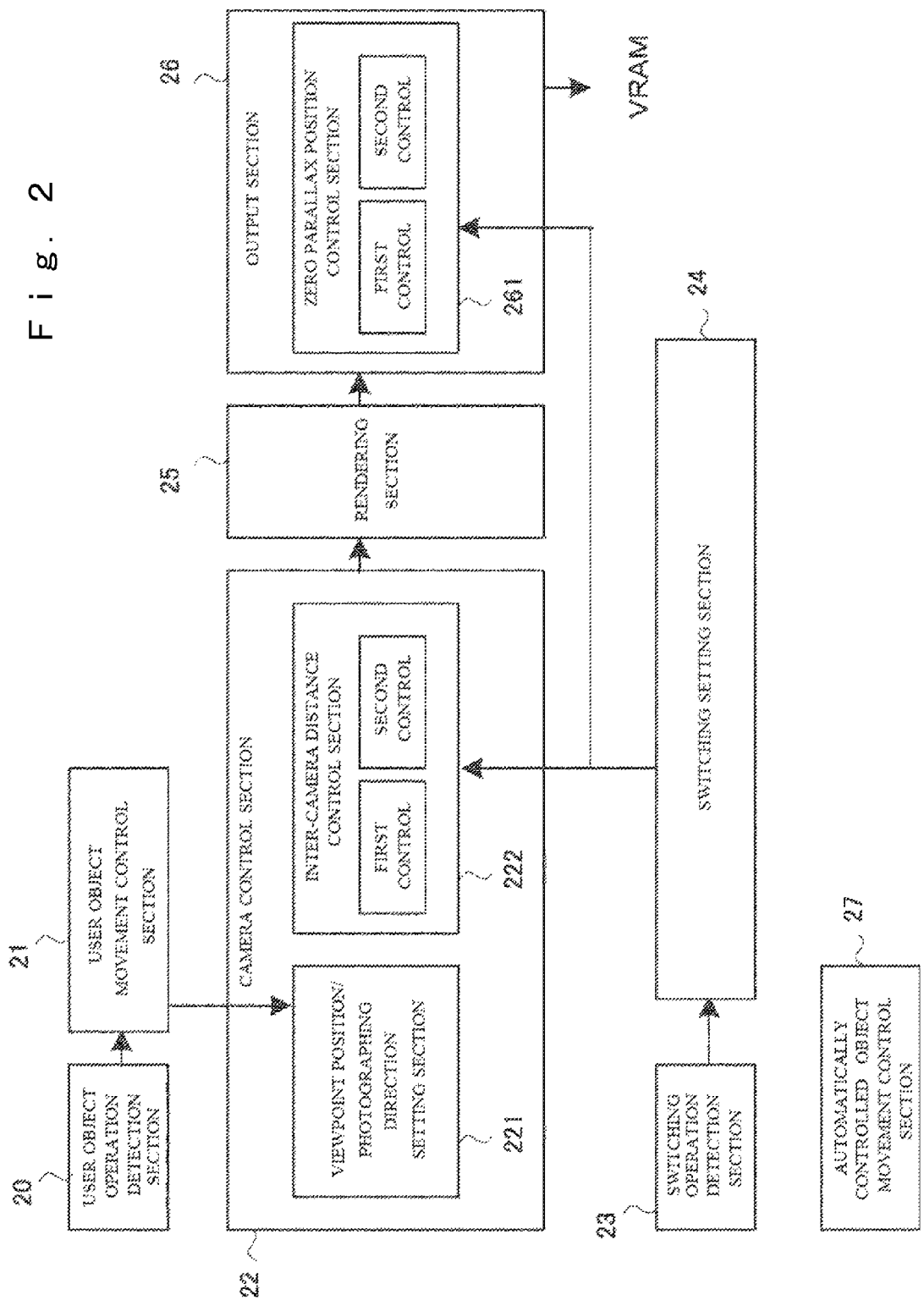
FIG. 2 is an example non-limiting functional block diagram.

FIG. 2 is a block diagram illustrating the functions achieved by the execution of the program 131 by the CPU 10. A user object operation detection section 20 detects that, using the operation section 11, a user has performed an operation of instructing the user object to move. Then, the user object operation detection section 20 notifies a user object movement control section 21 of the detection result. Then, the user object movement control section 21 controls the position of the user object in the virtual space in accordance with the contents of the operation notified by the user object operation detection section 20. More specifically, the position of the user object is changed in accordance with the operation performed on a direction input section such as a slide pad, which is an example of the operation section 11.

A switching operation detection section 23 detects that the user has performed an operation of switching stereoscopic display modes using the operation section 11. The technique according to the exemplary embodiment has two stereoscopic display modes. In a first mode, a zero parallax position is set near the user object, and the distance between a plurality of virtual cameras is set small. In a second mode, the zero parallax position is set closer to a position of the virtual cameras (a reference position described later) than in the first mode, and the distance between the plurality of virtual cameras is set greater than in the first mode.

More specifically, in the first mode, the zero parallax position is set away from the position of the user object in the direction of the position of the virtual cameras (the reference position described later) at a predetermined distance. The predetermined distance is set such that the zero parallax position is at least closer to the position of the user object than the middle position between the position of the user object and the position of the virtual cameras is (more preferably, than the position closest to the user object among the positions dividing the shortest distance between the user object and the virtual cameras into four equal parts is). For example, the zero parallax position may be set away from the position of the user object in the direction of the position of the virtual cameras at a distance about the size of the user object. On the other hand, in the second mode, the zero parallax position is set at or near the middle position between the position of the user object and the position of the virtual cameras, or set closer to the position of the virtual cameras than the middle position is. For example, in the second mode, the zero parallax position may be set at or near the middle position between the position of the user object and the position of the virtual cameras, or may be set at or near the middle position between the zero parallax position in the first mode and the virtual cameras.

It should be noted that the switching operation is different from a user object operation. More specifically, the switching operation may be an operation using a button switch, which is an example of the operation section 11. It should be noted that each mode may be assigned a button switch, or the modes may be switched in a toggle manner using a single button. When the switching operation has been performed, the switching operation detection section 23 selectively sets the first mode or the second mode. Further, the switching operation can be input simultaneously with the user object operation. Thus, the monitoring of the switching operation by the switching operation detection section 23 and the monitoring of the user object operation by the user object operation detection section 20 are performed in a simultaneous parallel manner.

When having detected the switching operation, the switching operation detection section 23 notifies the switching setting section 24 of the detection result. Then, the switching setting section 24 stores the setting obtained by the switching operation.

A camera control section 22 performs various types of control of the virtual cameras for photographing the virtual space. To perform stereoscopic display, the camera control section 22 controls the plurality of virtual cameras at all the viewpoints (typically, a right-eye virtual camera for generating a right-eye image and a left-eye virtual camera for generating a left-eye image). The camera control section 22 includes a viewpoint position/photographing direction setting section 221 and an inter-camera distance control section 222.

The viewpoint position/photographing direction setting section 221 at least sets the positions of the plurality of virtual cameras at all the viewpoints in the virtual space in accordance with the position of the user object set by the user object movement control section 21. For example, a reference position is set away from the position of the user object, or a position near it (for example, a position near and ahead of the user object) at a certain distance, and the positions of the plurality of virtual cameras are set on the basis of the reference position. Further, the viewpoint position/photographing direction setting section 221 sets the photographing directions of the plurality of virtual cameras. In the exemplary embodiment, the plurality of virtual cameras have a common photographing direction. The photographing direction is set in the direction of photographing the user object from the reference position described above. Typically, the photographing direction is set such that the position of the user object or a position near it (for example, a position near and ahead of the user object) is a fixation point. It should be noted that the photographing direction may or may not be the same as the direction of the user object, and may be determined by a given algorithm.

The positions of the plurality of virtual cameras are set on the basis of the reference position described above. For example, the right-eye virtual camera and the left-eye virtual camera are set away from the reference position to the left and right (in a direction orthogonal to the photographing direction) at a certain distance (which is changed by the inter-camera distance control section 222 as described later).

The inter-camera distance control section 222 controls the distance between the plurality of virtual cameras. Typically, the inter-camera distance control section 222 controls the distance between the right-eye virtual camera and the left-eye virtual camera. More specifically, on the basis of the switching setting stored in the switching setting section 24, the inter-camera distance control section 222, when the first mode is set, performs first control where the distance between the virtual cameras is relatively small; and when the second mode is set, performs second control where the distance between the virtual cameras is relatively great.

A rendering section 25 photographs the virtual space, including the user object and the automatically controlled object, using the plurality of virtual cameras controlled by the virtual camera control section 22, and thereby generates rendered images depicting the virtual space from the plurality of viewpoints. Typically, the rendering section 25 generates a right-eye rendered image using the right-eye virtual camera, and generates a left-eye rendered image using the left-eye virtual camera.

Figure 3A:
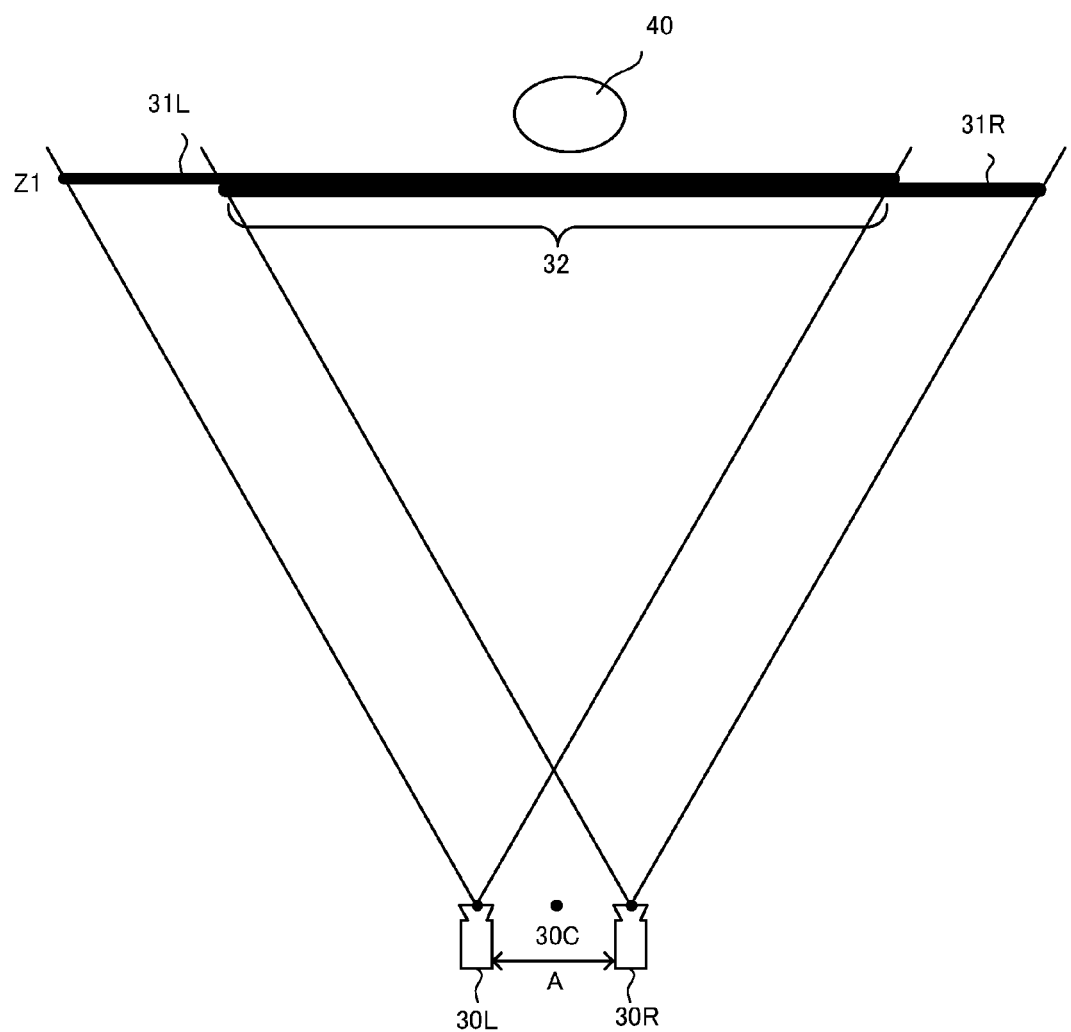
FIGS. 3A and 3B are example non-limiting schematic diagrams illustrating the control of a zero parallax position.
Figure 3B:
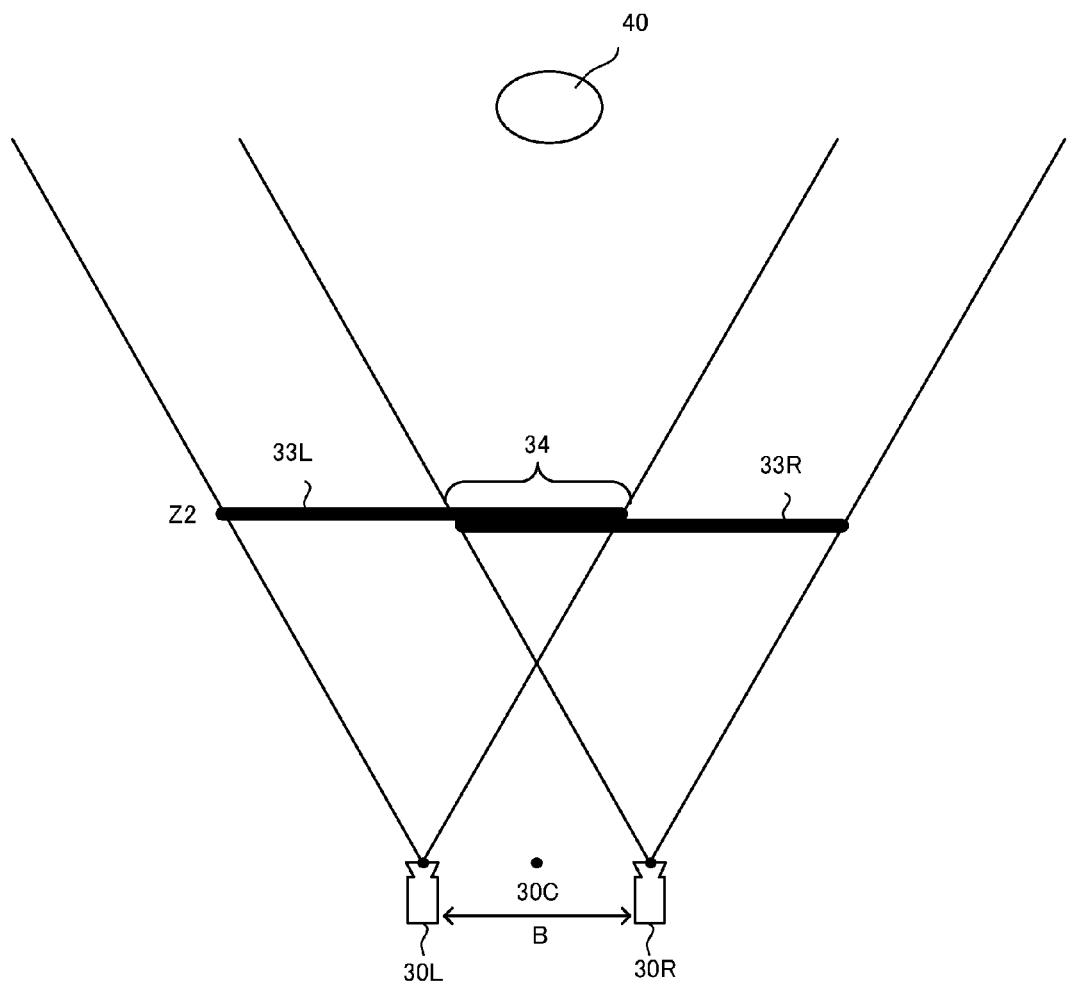

The images rendered by the rendering section 25 from the respective viewpoints are output to an output section 26. The output section 26 performs the process of outputting the images rendered by the rendering section 25 to the VRAM. The output section 26 includes a zero parallax position control section 261. The zero parallax position control section 261 controls, in each of the rendered images from the respective viewpoints, a range to be displayed on the stereoscopic display in accordance with the setting stored in the switching setting section 24, and thereby adjusts the zero parallax position. FIGS. 3A and 3B are diagrams illustrating display range control for adjusting the zero parallax position. FIGS. 3A and 3B display a plan view of the virtual space as seen from above. In the virtual space, a right-eye virtual camera 30R, a left-eye virtual camera 30L, and a user object 40 are present. The reference numeral "30C" represents the reference position for the virtual cameras. Further, the reference numeral "Z1" represents the zero parallax position in the first mode, which is a position set near the user object 40 and closer to the reference position 30C than the position of the user object 40 is. On the other hand, the reference numeral "Z2" represents the zero parallax position in the second mode, which is a position closer to the reference position 30C than the zero parallax position Z1 is. More specifically, the zero parallax position in the second mode is the middle position between the zero parallax position Z1 and the reference position 30C. The inter-camera distance A in the first mode is different from the inter-camera distance B in the second mode.

In addition, the reference numeral "31R" schematically shows an image rendered using the right-eye virtual camera 30R in the first mode, and the reference numeral "31L" schematically shows an image rendered using the left-eye virtual camera 30L in the first mode. Further, the reference numeral "33R" schematically shows an image rendered using the right-eye virtual camera 30R in the second mode, and the reference numeral "33L" schematically shows an image rendered using the left-eye virtual camera 30L in the second mode.

In the first mode, the zero parallax position control section 261 sets, as the display range of the stereoscopic display, the range included in the rendered image 31R and corresponding to a range 32 and the range included in the rendered image 31L and corresponding to the range 32, and writes the set ranges to the VRAM (the first control). Further, in the second mode, the zero parallax position control section 261 sets, as the display range of the stereoscopic display, the range included in the rendered image 33R and corresponding to a range 34 and the range included in the rendered image 33L and corresponding to the range 34, and writes the set ranges to the VRAM (the second control).

With the display range thus set, in the first mode, an object present at the position Z1 appears on the screen of the stereoscopic display so as not to have a parallax on the screen. Further, an object present further away from the virtual cameras than the position Z1 is appears as if present further in the depth direction than the screen, and an object present closer to the virtual cameras than the position Z1 is appears as if coming out of the screen. On the other hand, in the second mode, an object present at the position Z2 appears on the screen of the stereoscopic display so as not to have a parallax on the screen. Further, an object present further away from the virtual cameras than the position Z2 is appears as if present further in the depth direction than the screen, and an object present closer to the virtual cameras than the position Z2 is appears as if coming out of the screen.

The images for which the display range has thus been set by the zero parallax position control section 261 are written to the VRAM, and then, the images written in the VRAM are displayed on the stereoscopic display.

It should be noted that, in the exemplary embodiment, after rendering, some areas in the rendered images are set as the display range, thereby adjusting the zero parallax position. Alternatively, in another embodiment, only the corresponding ranges may be rendered during rendering.

In addition, an automatically controlled object movement control section 27 controls the movement of an automatically controlled object by a predetermined algorithm.

FIG. 4 is a flow chart showing the flow of processing performed by the functional blocks described above. First, in step S1, the user object operation detection section 20 detects the user object operation. Then, in step S2, the user object movement control section 21 controls the movement of the user object in accordance with the contents of the operation detected in step S1. Then, in step S3, the automatically controlled object control section 27 controls the movement of the automatically controlled object. Then, in step S4, the viewpoint position/photographing direction setting section 221 sets the viewpoint positions and the photographing directions of the virtual cameras at all the viewpoints on the basis of, for example, the position of the user object determined in step S3. Then, in step S5, the switching operation detection section 23 detects the operation of switching stereoscopic display modes. If it is detected in step S5 that the switching operation has been performed, in step S6, the switching setting section 24 switches stereoscopic display modes. Then, in step S7, the inter-camera distance control section 222 sets the distance between the cameras in accordance with the setting stored in the switching setting section 24. Then, in step S8, the rendering section 25 performs a rendering process from each viewpoint by photographing the virtual space with the virtual cameras at all the viewpoints set in steps S4 and S7. Then, in step S9, the output section 26 (the zero parallax position control section 261) sets the display range in the rendered image generated from each viewpoint in step S8, and in step S10, outputs the set display range to the VRAM.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a program to be executed by an information processing apparatus connected to a display apparatus capable of displaying a stereoscopic image, the program causing a processing section of the information processing apparatus to execute:
   generating a stereoscopic image by photographing, with a plurality of virtual cameras set at a predetermined viewpoint position in a virtual space where a predetermined object is present, the virtual space so as to include the object; and outputting the generated stereoscopic image to the display apparatus,
   selective switching being performed between: first control where control is performed such that, in the virtual space, an object present at a first position near and including the predetermined object appears on the screen of the stereoscopic display so as not to have parallax on the screen; and second control where control is performed such that, in the virtual space, an object present at a second position different from the first position, the second position being closer to the viewpoint position than the first position appears on the screen of the stereoscopic display so as not to have parallax on the screen,
   the program further causing the processing section to execute
   controlling an action of the object in accordance with a first operation performed by a user, the action including at least a movement, and
   switching between the first control and the second control in accordance with a second operation performed by a user, wherein
   the second operation is received simultaneously with the first operation.

2. The non-transitory computer-readable storage medium having stored therein the program according to claim 1, wherein
   the virtual space is a three-dimensional space.

3. The non-transitory computer-readable storage medium having stored therein the program according to claim 1, wherein
   the predetermined object is a player object.

4. The non-transitory computer-readable storage medium having stored therein the program according to claim 1, wherein
   when the first control has been selected, a distance between the plurality of virtual cameras is set smaller than when the second control has been selected.

5. An information processing apparatus comprising;
   a display apparatus, and one or more computer processors, configured to perform at least:
   display control for generating a stereoscopic image by photographing, with a plurality of virtual cameras set at a predetermined viewpoint position in a virtual space where a predetermined object is present, the virtual space so as to include the object; and for outputting the generated stereoscopic image to the display apparatus capable of displaying a stereoscopic image, the display control selectively switching between: first control where control is performed such that, in the virtual space, an object present at a first position near and including the predetermined object appears on the screen of the stereoscopic display so as not to have parallax on the screen; and second control where control is performed such that, in the virtual space, an object present at a second position different from the first position, the second position being closer to the viewpoint position than the first position appears on the screen of the stereoscopic display so as not to have parallax on the screen, the one or more computer processors further configured to perform controlling an action of the object in accordance with a first operation performed by a user, the action including at least a movement, and switching between the first control and the second control in accordance with a second operation performed by a user, wherein the second operation is received simultaneously with the first operation.

6. The information processing apparatus according to claim 5, wherein when the first control has been selected, a distance between the plurality of virtual cameras is set smaller than when the second control has been selected.

7. An information processing system connected to a display apparatus capable of displaying a stereoscopic image, the information processing system comprising one or more computer processors configured to perform at least:

display control for generating a stereoscopic image by photographing, with a plurality of virtual cameras set at a predetermined viewpoint position in a virtual space where a predetermined object is present, the virtual space so as to include the object; and for outputting the generated stereoscopic image to the display apparatus, the display control selectively switching between: first control where control is performed such that, in the virtual space, an object present at a first position near and including the predetermined object appears on the screen of the stereoscopic display so as not to have parallax on the screen; and second control where control is performed such that, in the virtual space, an object present at a second position different from the first position, the second position being closer to the viewpoint position than the first position appears on the screen of the stereoscopic display so as not to have parallax on the screen, the one or more computer processors further configured to perform controlling an action of the object in accordance with a first operation performed by a user, the action including at least a movement, and switching between the first control and the second control in accordance with a second operation performed by a user, wherein the second operation is received simultaneously with the first operation.

8. A method comprising generating a stereoscopic image by photographing, with a plurality of virtual cameras set at a predetermined viewpoint position in a virtual space where a predetermined object is present, the virtual space so as to include the object; and for outputting the generated stereoscopic image to a display apparatus capable of displaying a stereoscopic image, selective switching being performed between: first control where control is performed such that, in the virtual space, an object present at a first position near and including the predetermined object appears on the screen of the stereoscopic display so as not to have parallax on the screen; and second control where control is performed such that, in the virtual space, an object present at a second position different from the first position, the second position being closer to the viewpoint position than the first position appears on the screen of the stereoscopic display so as not to have parallax on the screen, controlling an action of the object in accordance with a first operation performed by a user, the action including at least a movement, and switching between the first control and the second control in accordance with a second operation performed by a user, wherein the second operation is received simultaneously with the first operation.

9. The method according to claim 8, wherein when the first control has been selected, a distance between the plurality of virtual cameras is set smaller than when the second control has been selected.

10. An information processing system connected to a display apparatus capable of displaying a stereoscopic image, the information processing system comprising one or more computer processors configured to perform at least:

display control for generating a stereoscopic image by photographing a virtual space with a plurality of virtual cameras set at a predetermined viewpoint position in the virtual space where an object is present; and for outputting the generated stereoscopic image to the display apparatus, the display control changing, in the virtual space, a position, where an object that appears on a screen of the display apparatus does not have parallax on the screen, from a first position close to the viewpoint position to a second position different from the first position, the second position being further away from the viewpoint position than the first position, the display control also narrowing a distance between the plurality of virtual cameras from the first position to the second position, the one or more computer processors further configured to perform controlling an action of the object in accordance with a first operation performed by a user, the action including at least a movement, and switching between the first control and the second control in accordance with a second operation performed by a user, wherein the second operation is received simultaneously with the first operation.

11. An information processing system connected to a display apparatus capable of displaying a stereoscopic image, the information processing system comprising one or more computer processors configured to perform at least:

display control for generating a stereoscopic image by photographing a virtual space with a plurality of virtual cameras set at a predetermined viewpoint position in the virtual space where an object is present; and for outputting the generated stereoscopic image to the display apparatus, the display control changing, in the virtual space, a position, where an object that appears on a screen of the display apparatus does not have parallax on the screen, from a first position near and including the object to a second position different from the first position, the second position being closer to the viewpoint position than the first position, the display control also widening a distance between the plurality of virtual cameras from the first position to the second position, the one or more computer processors further configured to perform controlling an action of the object in accordance with a first operation performed by a user, the action including at least a movement, and switching between the first control and the second control in accordance with a second operation performed by a user, wherein the second operation is received simultaneously with the first operation.

* * * * *